Jan. 25, 1955
H. MILLER
2,700,533
COOLER FOR FLOCCULENT OR GRANULAR MATERIAL
Filed June 19, 1950
2 Sheets-Sheet 1
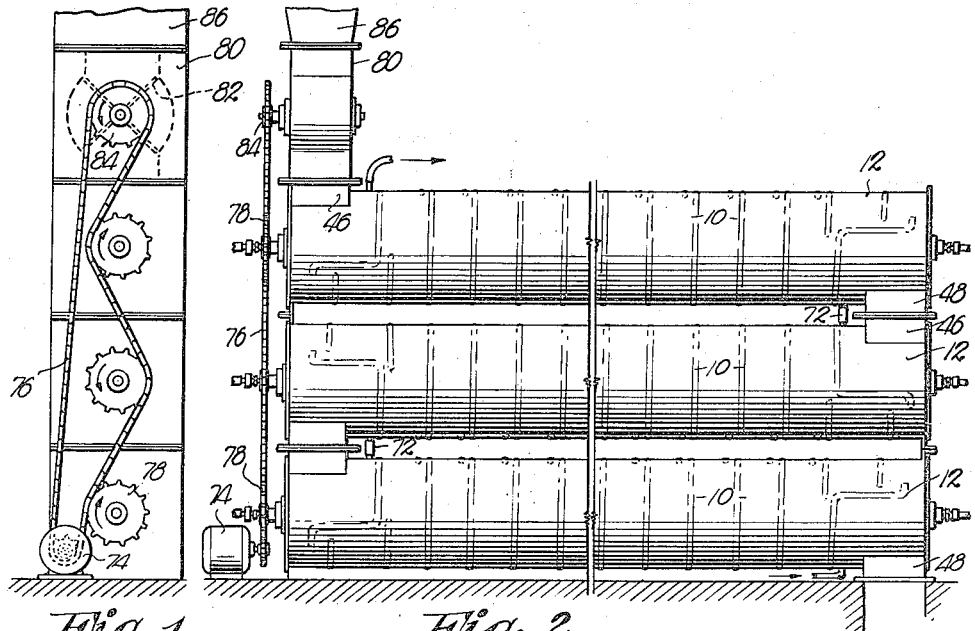
Fig. 1.
Fig. 2.
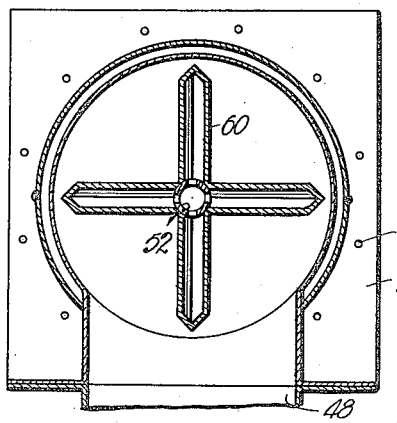
Fig. 4.
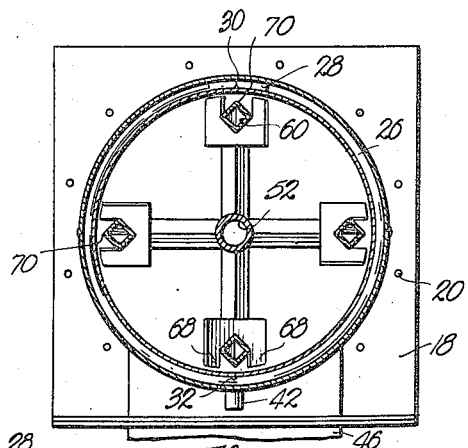
Fig. 5.
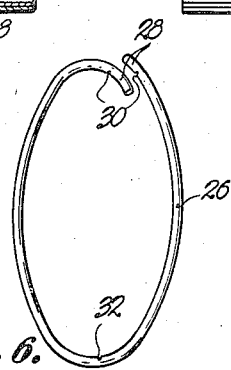
Fig. 6.
INVENTOR.
Harry Miller
BY
ATTORNEY.

Jan. 25, 1955          H. MILLER          2,700,533

COOLER FOR FLOCCULENT OR GRANULAR MATERIAL

Filed June 19, 1950          2 Sheets—Sheet 2

INVENTOR.
Harry Miller
BY
ATTORNEY.

United States Patent Office 2,700,533
Patented Jan. 25, 1955

2,700,533

COOLER FOR FLOCCULENT OR GRANULAR MATERIAL

Harry Miller, Kansas City, Mo., assignor, by mesne assignments, to Archer-Daniels-Midland Company, a corporation of Delaware Application June 19, 1950, Serial No. 169,011

2 Claims. (Cl. 257—211)

This invention relates to the field of heat exchange between substances of differing temperatures and particularly to the production of feed for farm animals, the primary object being to provide a cooler for dehydrated alfalfa meal capable when placed in use, of extremely high efficiency from the standpoint of utilizing a coolant to its fullest extent in absorbing the heat from the meal prior to sacking or other storage thereof.

In recent years, after the relatively new field of dehydration of farm crops has developed to a highly specialized undertaking; it has been found that the dehydration process has serious detrimental effects upon the natural properties of the feed unless properly treated immediately after dehydration and storage. The most serious of the harmful results consists in carotene or vitamin A loss. While the reduction in the carotene content of the alfalfa meal is almost directly proportional to the extent of heating thereof; the time factor is of extreme importance. In other words, the heating of the legumes of itself does not seriously affect the carotene properties but holding the meal at relatively high temperatures over a considerable period of time results in an ultimate, almost complete reduction of the carotene. This peculiarity is apparently not true of the other vitamins of the product since tests have shown that such vitamins are substantially stable and not seriously affected by the continued heated condition of the dehydrated meal.

It is apparent therefore, that competition in this field demands the maintenance of the carotene content of the alfalfa meal and that there is a need for an inexpensive, effective means for drastically reducing the temperature of the dehydrated legumes or other crops as quickly as possible after dehydration thereof, together with economical means for maintaining the lowered temperature if possible during storage and prior to actual shipment and delivery to the consumer.

It is the most important object of the present invention, therefore, to provide a cooler adapted to receive dehydrated crops or other material in a highly heated condition and to reduce the temperature thereof to a relatively low level as desired and depending upon the coolant that is utilized.

Another very important object of the present invention is the provision of a cooler as aforesaid that is capable of cooling material in direct proportion to the initial temperature of the coolant and to effectively utilize the latter in absorbing as much heat from the meal as is practically possible.

Another object of this invention is to provide a heat exchanger adapted to induce the flow of a number of substances of differing temperatures in opposite directions and in heat exchange relationship with common, highly conductive structure interposed therebetween.

A further object of this invention is the provision of a heat exchanger in the nature of a hollow body having therein means for moving a substance such as alfalfa meal, from one end of the body to the other and provided with means exteriorly of the body for inducing the flow of a suitable fluid having a temperature different from that of the alfalfa meal and in direct wiping engagement with or impinging relationship to the outer surface of the body whereas to effectively cause absorption of the contained heat of the alfalfa meal.

A still further object of this invention is to provide heat exchanging means particularly adaptable for cooling alfalfa meal emanating from a dehydrator and having a body for receiving the meal that is in turn provided with rotative structure adapted to carry the meal around the inner surfaces of the body toward an outlet opening formed therein, whereby a coolant impinging upon the outer surface of the body will effectively absorb a substantial amount of the heat in the alfalfa meal quickly and economically.

Other objects of this invention include the way in which the aforesaid rotatable structure is in turn provided with passageways for receiving a second coolant; the manner in which all of the coolants are directed through the apparatus in a direction opposite to the normal movement of the alfalfa meal to present a "counter action" throughout; the way in which the rotatable structure is provided with motivating means for the alfalfa meal that is in heat exchange relationship with the passages of the rotatable structure; the way in which the alfalfa impelling elements cooperate with tubular members forming the passageway and with the inner walls of the above mentioned hollow body in chopping the material to prevent passage of large lumps that present potential fire hazards; the way in which an increased pressure or jet-like nozzle action is produced in one of the coolants as the same traverses the outer surface of the hollow body; and the manner of eliminating air locking that would have a tendency to impede or stop the flow of coolant through the system.

Many additional, more minor objects will be made clear or become apparent as the following specification progresses, reference being had to the accompanying drawing, wherein:

Figure 1 is an end elevational view of a cooler for flocculent or granular material made in accordance with my present invention.

Fig. 2 is a side elevational view thereof.

Fig. 4 is a transverse, vertical, cross-sectional view taken on line IV—IV of Fig. 3 looking in the direction of the arrows.

Fig. 5 is a transverse, vertical, cross-sectional view taken on line V—V of Fig. 3; and Fig. 6 is a perspective view of one of the body encircling, coolant channelling rings showing the same disassociated from the remaining structure.

Figure 3:
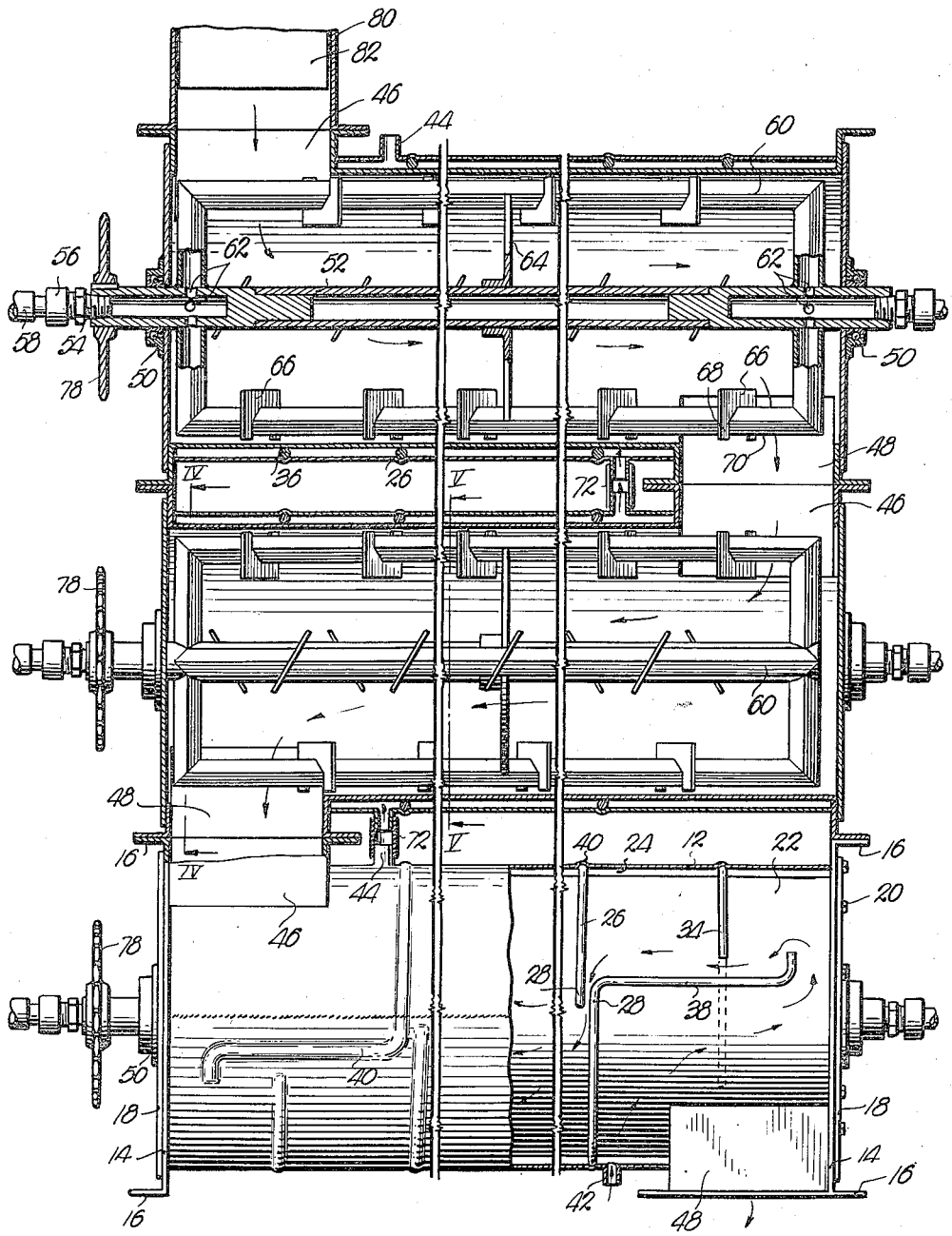
Fig. 3 is a substantially enlarged, side elevational view, parts being broken away and in section to reveal details of construction.

As above indicated, the assembly about to be described has been developed primarily for use in the field of alfalfa dehydration and in direct connection with the dehydrator for cooling the meal prior to sacking or storage thereof.

Other uses of the device will become apparent and enumerated in part after the full description of the component elements and their operation. Therefore, it is to be understood that through minor changes and insignificant adaptations, the entire heat exchanger may be placed in use for varied and sundry purposes.

As indicated particularly by Figs. 2 and 3 of the drawings, the heat exchanger or cooler hereof, is composed of a plurality of superimposed, substantially identical units, each of which is designated broadly by the numeral 10. Because of the substantial identity of units 10, only one will be described at the outset and it is seen that the same includes an elongated, hollow body that preferably takes the form of a cylindrical tube or shell 12.

Each end respectively of the shell 12 is provided with a continuous out-turned, annular flange 14 that is in turn rebent adjacent its uppermost and lowermost edge in a pair of laterally extending, substantially parallel, flanges 16. The ends of the shell 12 are closed by plates 18, at least one of which should be removably secured to the proximal flange 14 by a plurality of bolts or the like 20.

Mounted within the shell 12 and concentric therewith is an elongated, tubular, preferably cylindrical, hollow body 22 that has its ends in abutting relationship to the plates 18. The outside diameter of the body 22 is slightly less than the inside diameter of the shell 12 and the two telescoped members 12—22 are held apart by interposed rod-like construction for channelling a suitable coolant within space 24 between the elements 12 and 22.

The aforesaid rods that circumscribe the body 22, include a number of spaced-apart, split rings 26 (Fig. 6), having the ends 28 thereof overlapped and in slightly spaced relationship. Ends 28 are each provided with a small notch 30 on the inner face thereof and a like notch 32 is formed in the ring 26 in diametrically opposed relationship to ends 28 thereof. In addition, one end of the body 22 has an overlying arcuate rod 34 that circumscribes substantially half of the body 22 and the opposite end of the latter has a similar underlying arcuate rod 36 thereon.

As clearly indicated in Fig. 3 of the drawing, the split rings 26 next adjacent the outermost rods 34 and 36, are provided with an L-shaped lateral extension 38 on the end 28 thereof. It is noted that the extensions 38 project across one end of the proximal rod 34 or 36 as the case may be and in spaced relationship thereto. The rods 34 and 36, as well as the rings 26 having extension 38 thereon, are likewise provided with notches at the upper and lowermost ends thereof similar to notches 30 and 32.

The shell 12 is provided with indentations 40 for accommodating and setting all of the rod structure within the annular space 24. The shell 12 is provided with an inlet opening 42 at the bottom thereof and communicating with the space 24 and an opposed outlet opening 44 for passage of coolant as will hereinafter be set forth.

The hollow body 22 has an alfalfa meal inlet housing 46 and an outlet housing 48, both of which pass through the space 24 and communicate directly with the interior of body 22.

The plates 18 each carry a bearing 50 for rotatably receiving an elongated shaft 52 provided with hollow, outermost ends for receiving a tubular fitting 54. Through the medium of a stuffing box 56, a conduit 58 is rotatably coupled with fitting 54. Shaft 52 has connected directly therewith, a pair of intersecting polygonal frames 60 extending substantially the entire length of the body 22 therewithin and the four legs forming each frame 60 are hollow and polygonal in cross-section as is clear in Figs. 4 and 5 of the drawings.

The hollow frame members 60 are in direct communication with the hollow ends of the shaft 52 through the medium of a plurality of openings 62 formed in the latter. One or more spacers 64 on the shaft 52 serve to support the polygonal frames 60 intermediate the ends thereof.

The longitudinal stretches of the frame members 60 are each provided with a plurality of spaced-apart, angularly disposed, substantially U-shaped flat plates 66. The plates 66 are all joined directly with the frame members 60 in any suitable manner such as by welding and in heat exchange relationship with their supporting frameworks 60 with the bights of the plates or vanes 66 extending inwardly toward the shaft 52. The legs 68 partially embrace frame members 60 and terminate outwardly beyond the latter and in spaced relationship to the innermost face of the tubular body 22. It is noted also that each of the stretches forming each frame member 60, is provided with an elongated, relatively sharp, outermost edge 70 that is also slightly spaced away from the innermost face of the tube 22. It is also notable that the vanes or plates 66 are angled in a direction to cause movement of the alfalfa meal through the tube 22 from the inlet end 46 thereof to its outlet end 48.

It is seen that all of the units 10 just described, are substantially identical and that the same are superimposed in the manner illustrated in Figs. 2 and 3 with the flanges 16 of one unit 10 receiving and supporting the flanges 16 of the unit 10 next overlying. Such flanges 16 may be releasably interlocked if desired in any suitable manner. When the units 10 are stacked, the inlet 46 of each unit 10 is placed in direct communication with the outlet 48 of the unit 10 next above. Similarly, the outlets 44 of each unit 10 are placed in alignment with the inlets 42 and the same are connected with short conduits 72.

The manner of rotation of the shafts 52 and their accompanying frames 60, is of no particular importance and there is illustrated a prime mover 74 operably connected with a continuous belt or chain 76. Each shaft 52 respectively, has a sprocket 78 for receiving the endless chain 76 and the latter is passed over the sprockets 78 in the manner illustrated in Fig. 1 and in such fashion as to cause the shafts 52 to rotate in alternately opposite directions as indicated by the arrows in Fig. 1 of the drawings. The uppermost inlet opening 46 is in direct communication with a housing 80 that is provided with an air lock, paddle-type feeder 82 that is also continuously rotated by chain 76 through the medium of a sprocket wheel 84. Housing 80 communicates directly with the source of dehydrated alfalfa or other substance to be treated by the assembly through the medium of a hopper or conduit 86.

In the particular use contemplated hereby, the conduit 86 couples directly with a cyclone separator that in turn receives the feed directly from the dehydrator not shown. It is seen that the material to be treated entering housing 80 and passing into the uppermost inlet opening 46, falls by gravity into the top-most unit 10 and particularly into the hollow inner tube 22 thereof. This feed is thereupon immediately rotated by virtue of the rotation of uppermost shaft 52 and its intersecting frames 60. The inwardly extending, angularly disposed vanes 66 of the frames 60 carry the material laterally and in this case, horizontally toward the outlet end 48 of the uppermost unit 10 as the rotating structure within the uppermost tube 22 rotates constantly at a uniform speed. From the uppermost unit 10 the material is permitted to fall by gravity through the uppermost outlet opening 48 and into the inlet opening 46 of the next adjacent underlying unit 10. At this point, the material is again rotated and carried laterally in a direction opposite to its horizontal path of travel in the top-most unit 10. Again the material is fed by force of gravity into the bottom tube 22, rotated and carried horizontally to the lowermost outlet opening 48 for sacking, storage or other disposal.

Simultaneously, with such movement of the material being treated through the cooler, a suitable coolant, preferably in the form of a liquid and including a pre-cooled brine if desired, is forced through all of the annular passages 24 of the three units 10 for ultimate discharge at the uppermost outlet 44. The coolant entering at the lowermost end of the treater, passes as indicated by the arrows in Fig. 3, around the first laterally projecting L-shaped extension 38, between such extension 38 and the proximal end of the rod 34, and thence toward that end of the unit 10 having outlet 44 therein between the spaced-apart ends 28 of the ring 26 having extension 38 thereon.

The liquid continues its movement in this manner between ends 28 of all of the rings 26, past the extension 38 adjacent outlet 44 and then through the latter, upwardly into the chamber 24 of the next unit 10. It is seen that this coolant travels horizontally in a direction that is opposite to the horizontal direction of movement of the meal within the tubes 22, also indicated by arrows in Fig. 3. By the same token, the alfalfa meal rotates in alternately opposite directions as it passes from one unit 10 to the next unit and the coolant passing through the chambers 24 of all of the units, rotates in a direction opposite to the directions of rotation of the material being treated.

While the meal is thus being cooled by a relatively low temperature fluid passing through the compartments 24, a coolant is also passed through all of the ends of the three shafts 52 illustrated, as well as through the four stretches of each of the two frame members 60 in each tube 22 respectively. Such coolant is directed into the rotating structure by means of the conduits 58 where the same passes from openings 62 at one end of the shaft 52 into the framework 60 and thence out through the opposite opening 62 and opposite conduit 58. Here again, it is desired that the horizontal movement of the coolant within the frames 60 be opposite to the direction of horizontal movement of the meal within the drums 22 and any suitable manner of interconnecting the conduits 58 may be used for this purpose. By way of example, it is suggested that the coolant be directed into one end of one of the shafts 52 and that such shafts be interconnected by means of the conduits 58 with the coolant passing to discharge after the same has traversed all of the rotating, hollow frame-like members 60.

Actual use of the cooler hereof has proved that for a given volume of meal passing through the tubes 22 at a constant rate, the temperature of any coolant that is used to supply the inlets 42 and the conduits 58, will rise regardless of its original temperature, to within approximately one degree Fahrenheit of the temperature of the alfalfa meal as the same emanates from the lowermost outlet 48. In other words, it has been positively proved that unless the cooler is loaded beyond its normal capacity with respect to passage of the meal, the maximum amount of heat will be drawn from the meal by the coolant with the temperatures of the meal and of the coolant at the outlet ends thereof being approximately the same, depending of course, upon the overall size of the unit and including the diameters and length of the tubes 22; the use of three units 10 as illustrated is as efficient as is practically necessary but it is to be understood that the number of units to be used will vary in accordance with many conditions.

It is to be noted that the meal is caused to slide along the inner faces of the tubes 22 and in relatively close relationship to the coolant within chambers 24 by the fins 66. Furthermore, by virtue of the extended ends of legs 68, the said inner faces will be kept clear of the material and in this respect, such constant cleaning is highly important because of the fact that alfalfa meal has a great tendency to coat or cling to any surface against which it comes into contact. It is notable further that the alfalfa substance is in direct heat exchange relationship with all of the frames 60 in the heat and the meal will be easily and quickly absorbed by the coolant passing therethrough. Furthermore, all of the fins 66 are in heat exchange relationship with the frame members 60 and with the alfalfa material passing through the system.

Another important factor that has been taken into consideration is the tendency for dehydrated material of this character to develop slowly burning lumps. In other words, any hot spark or metallic object or even action of internal combustion that commences to smolder within the dehydrated material, will continue to burn slowly and at the same time to build up a wall of resistance in the form of a lump of the material. Subsequently, and without notice, this burning action continues until a tremendous fire hazard is presented.

It is to be noted in this system that the relatively sharp edges 70 are in close proximity to the walls of tubes 22, and, together with the action of the extended ends of legs 68, act upon the alfalfa meal to break up the aforesaid lumps as the same traverse the bodies 22. These edges 70 also cooperate with the fins 66 in keeping the inner faces of the bodies 22 clear of gumming by the alfalfa.

Finally, with respect to the particular cross-sectional contour of the members forming frames 60, the polygonal shape produces a relatively large surface area that comes into heat exchange relationship with the material to be treated.

The use of the rods 34, rings 26 and extensions 38, is extremely important in this device because of the way the same operate to prevent filming of the coolant around the outer surface of the tubes 22 as the same passes through the chambers 24. The liquid is initially directed into the lower inlet 42 under pressure and as the liquid passes between the ends 28, the same is pressurized and emanates from such space between the legs 28 in the form of a jet or nozzle action. Consequently, the coolant moves continually along the outer surfaces of the tubes 22 impinging thereon, and thereby absorbing the maximum amount of heat without forming a stagnant coating on the tubes 22. Furthermore, through use of the notches 30 and 32, entrained air within the coolant will be free to pass through the chambers 24 without producing an air block.

As above mentioned and as is now clear, the entire assembly may be used in many other fields other than dehydration of alfalfa and of course, including the dehydration of virtually any legume or any other farm crop. Ordinarily, well water will usually be found to have a sufficiently low temperature to cool the dehydrated products to a point where the carotene loss thereof will be reduced tremendously. By so cooling the material before storage, the insulation properties thereof may be utilized advantageously to maintain the meal in a relatively cool condition rather than to hold the same in a hot condition as is current practice where cooling means is not provided.

While it has been assumed throughout the above specification that the substance to be treated shall be cooled with fluids having a lower temperature, it is apparent that the opposite effect may be produced if desired. For instance, in the field of pelleting animal feeds, it is necessary to heat the material to be pelleted slightly and to add substances such as bentonite, to aid in the pelleting operation. Accordingly, the fluid that is passed into the lowermost inlet 42 may well be steam and as the feed to be pelleted is directed through the tubes 22, the aforesaid bentonite can easily be blended therein at the inlet end 86 of the system.

Many advantages will of course arise through use of the product conditioner including reduction of carotene losses, virtual elimination of fire hazards, enhancing the possibility of obtaining insurance protection at nominal rates, reducing the cost of transportation because of the elimination of the aforsaid hazards, increasing the value of the meal itself and therefore, permitting the demand of higher selling prices and permitting immediate sacking or other storage of the cooled meal in virtually any type of container because of the fact that the fire hazard has been practically eliminated.

Such other advantages as may develop through use of the structure, are of course, contemplated hereby and it is therefore, desired to be limited only by the spirit of the invention as defined by the scope of the appended claims.

Having thus described the invention what is claimed as new and desired to be secured by Letters Patent is:

1. In a heat exchanger, an elongated, hollow body having a materials inlet opening adjacent one end thereof and a materials outlet opening adjacent the opposite end thereof; a shell surrounding the body in spaced-relationship thereto; and a plurality of spaced split rings circumscribing the body within the shell to present a plurality of compartments between the body and the shell, said rings having the ends thereof overlapped and spaced apart to present circumferential, restricted passages between said compartments, said passages being in alignment longitudinally of the body whereby fluid passing therethrough under pressure travels circumferentially between passages.

2. The apparatus as set forth in claim 1 wherein said split rings are provided with notches on the inner edges thereof, said notches presenting passages between said rings and the body for release of entrained air from within said compartments.

References Cited in the file of this patent

UNITED STATES PATENTS

| Number | Name | Date |
|---|---|---|
| 173,078 | Stacy | Feb. 1, 1876 |
| 173,770 | Darling | Feb. 22, 1876 |
| 202,979 | Bates | Apr. 30, 1878 |
| 324,182 | Stollwerck | Aug. 11, 1885 |
| 536,785 | Griesser | Apr. 2, 1895 |
| 575,983 | Perky | Jan. 26, 1897 |
| 934,603 | Gedge | Sept. 21, 1909 |
| 1,546,336 | Browne | July 14, 1925 |
| 2,118,421 | Steinmann | May 24, 1938 |
| 2,182,556 | Griswold | Dec. 5, 1939 |
| 2,242,702 | Fulmer | May 20, 1941 |
| 2,243,317 | Phelan | May 27, 1941 |
| 2,478,889 | Harris | Aug. 16, 1949 |
| 2,484,070 | Boyce | Oct. 11, 1949 |
| 2,540,250 | Feldstein et al. | Feb. 6, 1951 |

FOREIGN PATENTS

| Number | Country | Date |
|---|---|---|
| 313,780 | Great Britain | June 20, 1929 |